United States Patent [19]
Crump et al.

[11] 3,911,388
[45] Oct. 7, 1975

[54] ACCELEROMETER
[75] Inventors: Eldon Eugene Crump, Richmond; James Harold Brown, Houston, both of Tex.
[73] Assignee: Houston Products and Services, Inc., Houston, Tex.
[22] Filed: Sept. 21, 1973
[21] Appl. No.: 399,605

[52] U.S. Cl. ............... 340/17; 310/8.4; 310/9; 310/8.3; 340/10
[51] Int. Cl. ............................................. G01v 1/16
[58] Field of Search ............ 310/8.4, 9, 8.3; 340/17; 181/101, 108

[56] References Cited
UNITED STATES PATENTS
| | | | |
|---|---|---|---|
| 1,930,905 | 10/1933 | Nicolson | 310/8.4 |
| 2,849,629 | 8/1958 | Kissinger | 310/8.4 |
| 3,006,280 | 10/1961 | Rogers et al. | 310/9 |
| 3,584,243 | 6/1971 | Fabian | 310/8.3 |
| 3,735,161 | 5/1973 | Perkins et al. | 310/8.4 |

*Primary Examiner*—Maynard R. Wilbur
*Assistant Examiner*—T. M. Blum
*Attorney, Agent, or Firm*—Murray Robinson

[57] ABSTRACT

An accelerometer unit includes an assembly comprising a spherical mass sandwiched between two disc shaped piezoelectric crystals positioned diametrically opposite each other relative to the sphere and each conductively cemented to a disc shaped spring (at times centrally etched) of larger diameter, the crystals having unlike polarity surfaces facing the mass, the annulas around the point of contact of each crystal with the sphere having silicon rubber or like material disposed therein adhered to the crystal, spring, and mass, the foregoing assembly being captured between inwardly facing shoulders of a two part telescoping case, the space inside the case around the assembly being filled with air.

10 Claims, 6 Drawing Figures

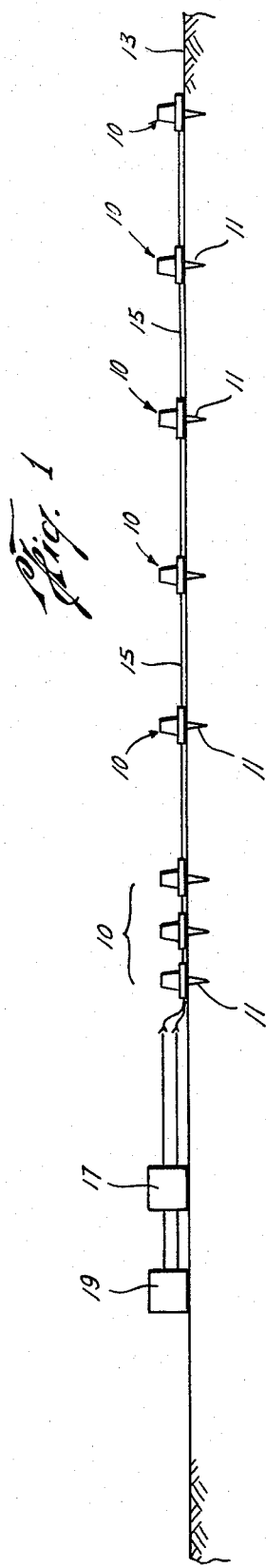
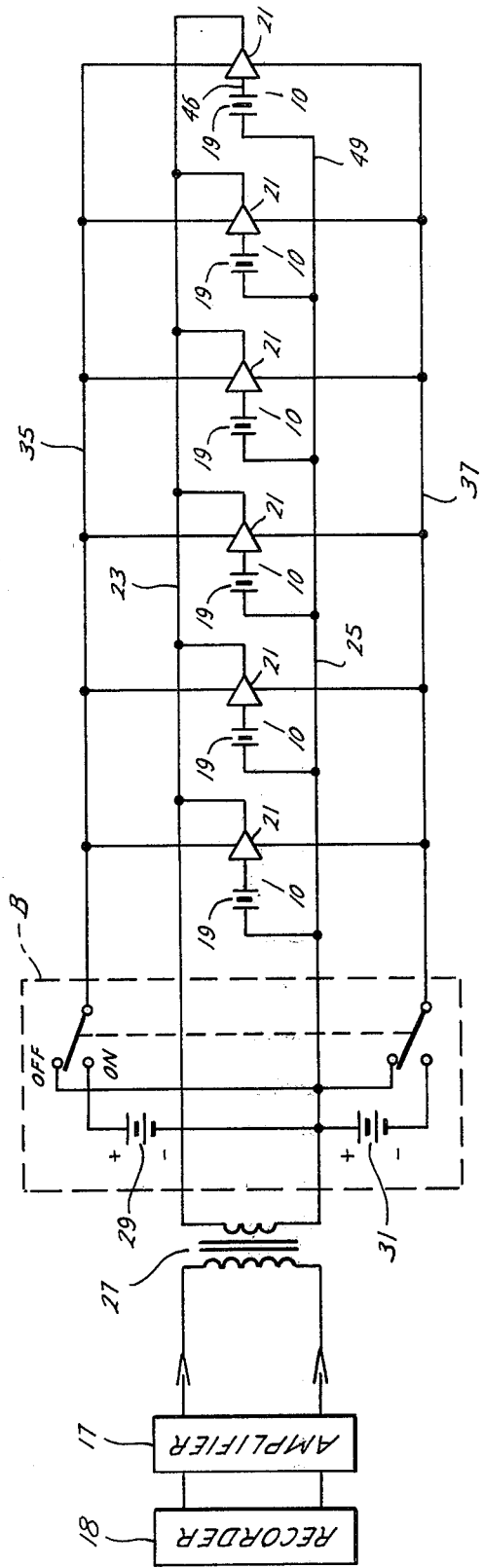

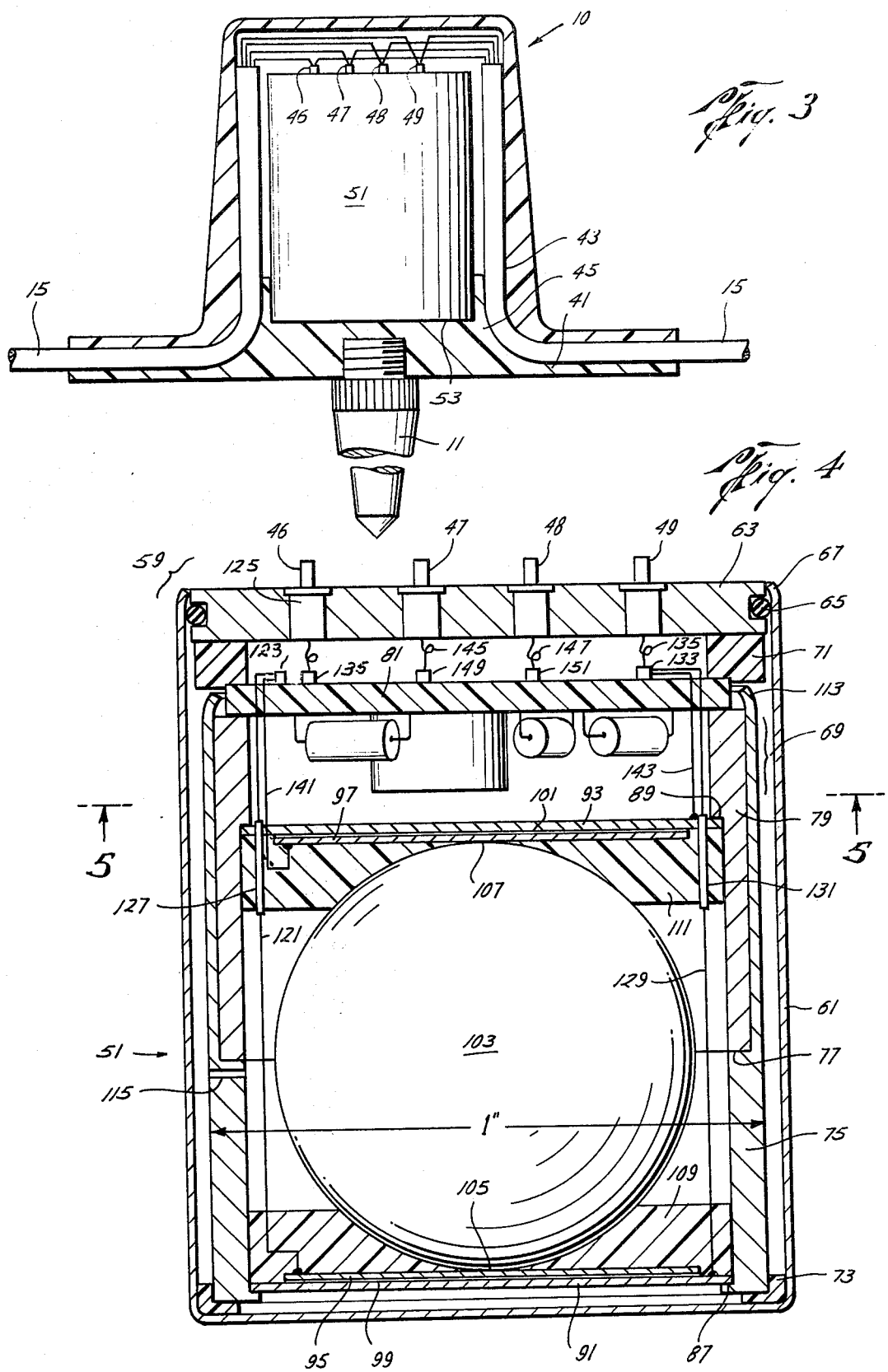

ACCELEROMETER

BACKGROUND OF THE INVENTION a. Field of Invention

This invention pertains to accelerometers and in particular to accelerometers responsive to earth vibrations known as seismometers having a response range from about 0.1 to 1000 cycles per second or higher.

b. Description of the Prior Art

Seismometers are known which include a casing adapted to be coupled to the earth, a mass resiliently mounted within the casing, and a mechanico-electrical transducer for converting relative motion of the mass and case into electric signals. Also, damping means brings the oscillating mass-spring system to rest in the absence of acceleration.

Accelerometers are discussed at pages 93 through 141 of a book entitled "The Handbook of Transducers for Electronic Measuring Systems," pages 97–98, referring to capacitive types employing a circular, e.g. disc shaped mass between a fixed plate and a diaphragm to which the disc is secured; and pages 98–105 referring to polarized piezoelectric types with and without support springs.

A piezoelectric type accelerometer especially suited for seismic work, called a seismometer, is disclosed in U.S. Pat. Nos. 3,489,997 issued Jan. 13, 1970 and 3,555,503 issued Jan. 12, 1971, both on the applications of H. B. Morris, to which reference may be made for details of an overall system useful in seismic exploration. Such a system includes a plurality of seismometers disposed on the earth's surface, e.g. along a line, and each connected to a recorder to record reflected or refracted earth vibrations initiated by a suitable seismic source such as an explosive charge detonated at a selected location adjacent to or somewhat removed from the seismometers.

The aforementioned Morris U.S. Pat. No. 3,555,503 discloses a case within which piezoelectric crystal discs are mounted by silicone rubber pads. Within the case is disposed a silicone fluid (Dow Corning 111) which serves as the inertial mass. Relative motion of the plastic and case effects bending of one or more pairs of the silicone rubber mounted piezoelectric crystal type transducers, producing electric signals that are immediately amplified by a first stage of amplification disposed within the case.

An earlier U.S. Pat. No. 3,374,663 issued Mar. 26, 1968 on the application of Morris discloses a piezoelectric crystal pair having an inertial mass associated with the central portion of the crystal. Reference may also be made to this patent e.g. for details of piezoelectric crystals.

Silicone elastomers are a well known class of rubber-like material and are described on pages 125–135 of the Vanderbilt Rubber Handbook, copyright 1958, the references on page 135 thereof including "An Introduction to the Chemistry of Silicones". Room temperature vulcanizing (RTV) types of silicone rubber material are described in Dow Corning Bulletin 61-016 dated 7/70 entitled "Information about Electrical/Electronic Materials," referring to the materials as "Dow Corning (R) 3144 and 3145 RTV Adhesive/Sealants." See also "Silicone Electrical and Electronic Materials," copyright 1968 by Dow Corning Corporation. RTV Silicone Rubber is also described in "G E Silicones Industrial Products" published by General Electric Company (CDS-852A).

Houston Products and Services, Inc. have built models of an accelerometer for seismic work as early as about August of 1971 using for the seismic mass a transformer and employing high capacitance, very thin crystals. The transformer used has a very high inductance primary and considerable step down turns ratio from primary to secondary. Thus the series resonance of the crystal capacitance and the transformer inductance is low while a sufficiently low output impedance is maintained at the expense of lowered output signal level. This choice was considered because of high capacitance crystal availability, lower cost and simpler construction than the impedance transforming amplifier approach with its associated requirement for external power.

Houston Products and Services, Inc. constructed their model CA-2 accelerometer and shipped it to a concern, no charge, for laboratory examination and return in December of 1971. In this construction a hollow cylinder was the mass and a pre-amplifier was mounted in the cylinder. Oil was used for damping. This was a prototype of a larger accelerometer model CA-3, which was sent to the same concern in February of 1972, no charge, for field evaluation, to be returned upon completion of tests. Two Model CA-3 accelerometers were sold in April and May of 1972 to another concern and three more were delivered to the same concern, no charge, for evaluation and return in September 1972. A model CA-4 accelerometer, similar to the CA-3 type was delivered no charge, for evaluation and return, to another concern, about April of 1972, along with an interim unit known as a CA-5, also for evaluation and return. A further CA-5 unit was sent to the latter concern in June of 1972, again for evaluation and return.

The CA-3 type shown on a drawing dated Mar. 15, 1972, can accept within its inner cylinder either a transformer or a amplifier assembly. When a transformer is used, no external power is needed. Either version includes an outer case comprising an outer cylindrical body clamped between two cups having flanges at their mouths disposed mouth to mouth and held together by screws through the flanges. A stud projects inwardly from the bottom of each cup. An inner cylinder is movably mounted inside the outer cylinder. Dished plastic holders attached to the ends of the inner cylinder support beryllium spring discs to which are cemented piezoelectric crystal plates of smaller area. The springs and crystals are of rectangular shape. The resulting drum shaped body engages at each end with the aforementioned studs, which are tightened to preload the crystals engaged therewith. A rubber diaphragm at each end of the inner cylinder, between the cylinder and the dished plastic holders and extending out to engage the case, seals the interior of the inner cylinder, within the inner cylinder may be mounted either a transformer or an amplifier which together with the inner cylinder, serves as seismic mass. The diaphragm also seals the outer cylinder from the rest of the interior of the casing, and within the annulus between its inner and outer cylinders is a silicone damping fluid. There are output terminals from the passive piezo crystals so they can be connected to the transformer or amplifier and there are feed through terminals whereby a plurality of the accelerometers can be connected in parallel.

In the foregoing development the aim was to solidly connect the springs to both the case and the seismic mass in order that mechanical resonance would be on the order of several kilocycles per second, far above the frequency bank of interest (approximately 0.1 to 1000 cycles per second). Also, an effort was made to keep cost down. In further development leading to the present invention experiments have been conducted with a variety of mass shapes, built up springs, hole patterns in springs under the crystals, with the aim of obtaining maximum crystal bending and output energy with minimum distortion. A test model of the present invention was made about September 1972, and in October 1972 was sent to a concern no charge, for evaluation and return.

SUMMARY OF THE INVENTION

According to the invention there is provided a spherical seismic mass disposed between two disc shaped spring mounted piezoelectric crystals, with silicone rubber rings in the annular space between each spring and the sphere around the spring-sphere point of contact and extending out to the surrounding case, the silicone rubber being adhered to the spring, sphere, and case. The silicone rubber provides a holder which centers the sphere on the spring, it becomes part of the spring it couples the sphere to the spring, and it serves as a damper at high frequencies. Through the spring the outer edge of the crystal is solidly coupled to the case. The spring may be weakened by etching over a circular area of about one-half the distance from the crystal center to the crystal edge in such a fashion as to minimize distortion and/or increase the crystal bending thus obtaining greater efficiency and higher output levels. The silicone rubber effects a like result since the coupling provided by the silicone rubber between the sphere and spring varies in thickness, effecting decreasing coupling as the material thickness decreases progressing radially outward. Use of this material between the spherically shaped ends of the seismic mass and the flat crystal and spring assembly couples the acceleration forces in a non-linear fashion. The non-linear bending of the spring and crystal assembly due to multiple thicknesses and materials and the non-linear voltage output of the crystal even in response to linear bending tend to be nearly perfectly neutralized by said non-linearity of the said elastomeric coupling. This yields lower distortion voltage output than would be had if this material were omitted.

The spherical mass according to the invention is near one end of a spectrum of possible masses investigated varying from a flat ended upright cylinder with its flat ends in planar contact with the springs, through a cylinder disposed on its sides with its curved sides in line contact with the springs, a barrel shaped mass, a sphere, and a pair of conical tips on a mass otherwise out of contact with the springs. A square (plane) shape, if cemented to the crystal, would not tend to bend the crystal at all and yield a very reduced output. Even if coupled with silicon rubber, very poor output that is non-linear with frequency will result. At the other extreme, a steep cone on the seismic mass would not transmit much energy through the silicone rubber ring to the spring so bending would not be as efficient or as distortion free. The coupling advantages of the spherical shape are maintained as long as the mass to rubber interface is a spherical in form.

BRIEF DESCRIPTION OF THE DRAWINGS

For a more detailed description of the invention reference will now be made to the accompanying drawings wherein:

FIG. 1 is a side elevation of a string of seismometers and associated amplifying and recording equipment showing a manner of use of seismometers as previously known;

FIG. 2 is a schematic diagram of the electric circuit of the apparatus shown in FIG. 1;

FIG. 3 is a section through the housing of a seismometer such as shown in FIG. 1 and as may be used with the present invention; an accelerometer unit disposed therein being shown in elevation;

FIG. 4 is a section through an accelerometer unit embodying the invention, drawn substantially to seale;

DETAILED DESCRIPTION OF A PREFERRED EMBODIMENT

Figure 5:
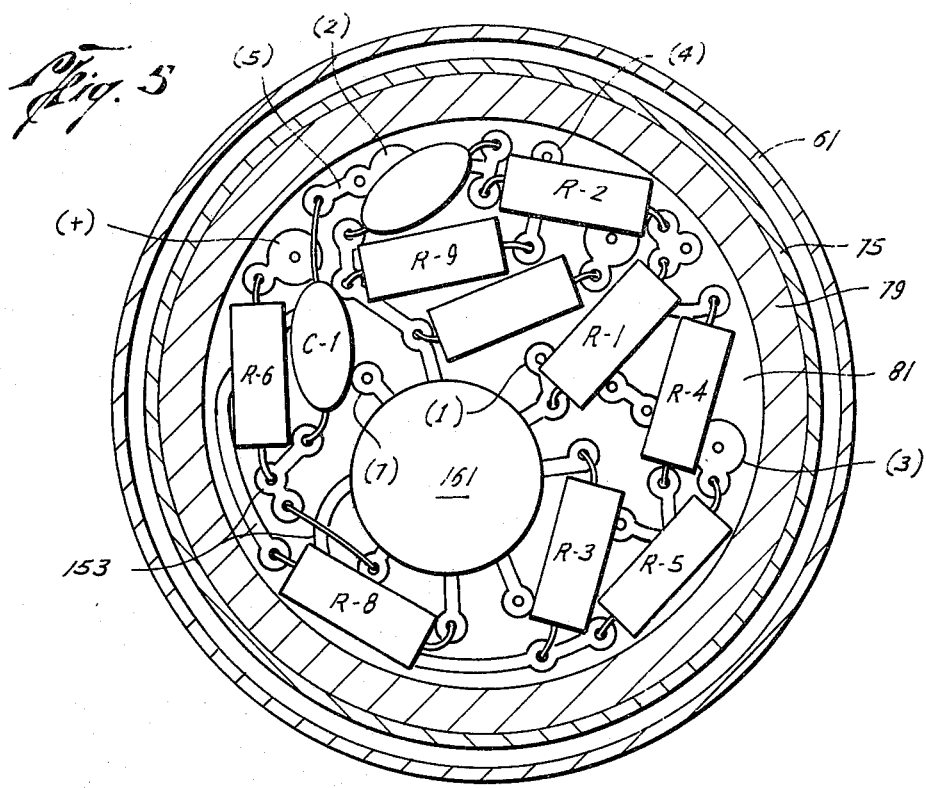
FIG. 5 is a section taken at plane 5-5 of FIG. 4.

Referring now to FIGS. 1 and 2 there is shown a plurality of seismometers 10 having their outer housing points 11 driven into the ground 13. The seismometers are interconnected by cable lengths 15. The string including seismometers 10 and cable lengths 15 is connected at one end to amplifier 17 and recorder 18.

Referring particularly to FIG. 2, each seismometer includes a piezoelectric crystal — seismic mass assembly 19 connected in series circuit with a unity gain or low gain impedance matching amplifier 21 for changing the piezoelectric crystal's output impedance from high to low. The series circuit containing piezoelectric crystal-seismic mass 19 and amplifier 21 is connected in parallel across conductors 23–25 leading to the primary of 3½ to 1 step-up isolation transformer 27. Like crystal polarities of piezoelectric crystal-seismic mass 19 are continued to wire 25. This transformer is used primarily to eliminate any small op. amp. voltage (D.C.) offset and will often be omitted. The crystal-mass assemblies 19 are externally powered by batteries 29, 31, enclosed as indicated by dashed line 32. The batteries can be connected to assemblies 19 through switch 33 via conductors 35–37.

Referring now to FIG. 3, each seismometer 10 includes a plastics material housing 41 of known configuration including telescoping inner and outer portions 43, 45. Cable lengths 15 are clamped between portions 43, 45 and connect to terminals 46, 47, 48, 49 (see also FIG. 2). Point 11 is screwed into the bottom portion 45 of the housing. The point is used to couple the housing to the earth by driving the point into the ground as shown in FIG. 1. Other methods of ground coupling have also been used. Accelerometer unit 51 is of generally cylindrical shape and is disposed inside housing 41 which fits snugly but without binding around the curved sides of the unit. The lower end of the unit is flat and adpated to rest on the flat bottom interior surface 53 of the housing, the weight of the unit being received by surface 53 so that the unit is coupled to the housing to receive vibrations of the earth.

Referring now to FIG. 4, accelerometer unit 51 includes an electromagnetic wave shield comprising a steel shield cup 61 closed at its upper end by brass shield header 63 sealed thereto by O ring 65. The upper edge 67 of the cup is rolled in to retain the header and firmly grip inner case 69 within the outer case through plastics material (LEXAN) upper and lower centering rings 71, 73.

Inner case 69 includes tubular aluminum shell 75 having an internal annular upwardly facing shoulder 77. A metal tube 79 telescopes within shell 75 and rests at its lower end against shoulder 77. On the upper end of tube 79 is supported plastics material disc 81 which serves as a mounting board for a printed circuit and amplifier elements as shown also in FIG. 5.

An upwardly facing shoulder 87 on shell 75 and a downwardly facing shoulder 89 on tube 79 provide circumferential support for lower and upper beryllium-copper circular disc springs 91, 93. Often the central areas of the springs are weakened by etching, e.g. over an area of about ½ inch in diameter. Centrally disposed on the springs 91, 93 are circular disc shaped piezoelectric upper and lower crystals 95, 97, each of about ½ inch diameter equal to that of the weakened area of the springs. The crystals are affixed to the springs by conductive cement layers 99, 101. An epoxy cement containing silver powder is preferred as the cement. A seismic mass 103 is provided by a spherical steel ball. Suitable balls are readily available from makers of ball bearings, so that it is easy to obtain balls of precise dimensions and close tolerances. The ball contacts the centers of the crystals at points 105, 107, and is held in position by formed and cured in place silicone rubber rings 109, 111 adhered to the crystals, springs, and ball. After the springs, crystals, rings, and sphere have been assembled in the inner case 69, the upper edge 113 of the shell 75 is rolled in to hold the inner case together with the ball, crystals, rings and springs captured therein between shoulders 87, 89. A vent hole 115 in shell 75 allows the assembly to breathe, the space inside the case being filled with air. The vent hole is only necessary when the curing process of the compound used to form rubber rings 109 and 111 requires atmospheric contact to properly cure.

In manufacturing the accelerometer the crystals are cemented to the springs and the spring-crystal units are coated with a suitable sealant. A spring-crystal unit 93, 101, and 97) are placed in place in tube 79 in inverted position in a jig so gravity holds the spring assembly against shoulder 89. Tubes 131 and 127 are put in place and a layer of the uncured rubber (or like compound) is added over the spring-crystal assembly. Then the seismic mass, ball 103, is placed in position and held centered and under small pressure by a jig, causing the ball to form contact 107, which is necessary only for good mechanical coupling. The rubber compound is allowed to cure sufficiently to hold the ball and the spring-crystal assembly, and tube 79 in place, even when reinverted.

Spring-crystal assembly (95, 99 and 91) is then placed in a jig holding shell 75 so gravity holds it against shoulder 87. A layer of the uncured rubber (or like compound) is added over the spring-crystal assembly. Wires 121 and 129 are threaded through tubes 127 and 131 and tube 79 with its associated spring-crystal assembly, ball and rubber layer, is slid down into position as shown in FIG. 4. A jig places enough pressure on tube 79 to bend the springs and bottom tube 79 against shoulder 77. Now the shell 75 may be rolled (as shown by FIG. 4, 113) and the assembly placed in an environment conducive to complete curing Temperatures should not be allowed to exceed that maximum temperature recommended for operation of the pzieoelectric crystals used. After curing the rest of the assembly may be accomplished.

The preferred silicone rubber is a compound known as Dow Corning 3145 RTV adhesive-sealant, or a compound known as General Electric RTV-577 Silicone rubber. Other materials having like physical properties may be used, such as a general purpose General Electric silicone rubber RTV adhesive sealant. In the uncured state such material is a thixotropic paste. The physical properties of Dow Corning 3145 RTV adhesive/sealant are as follows:

| Physical Properties:<br>(After 5 days at room temperature) | Dow Corning<br>3145 RTV<br>Adhesive/Sealant |
|---|---|
| Color | Grey |
| Specific Gravity | 1.12 |
| ASTM D 676 Durometer Hardness, Shore A | 33 |
| ASTM D 412 Tensile Strength, psi | 700 |
| ASTM D 412 Elongation, percent | 675 |
| ASTM D 624 Tear Strength, Die B, ppi Peel Strength, from primed aluminum panel, ppi (¼ inch by 0.012 primed strip of steel screen) | 65 |
| Thermal Conductivity 24 to 100C (75.2 to 212 F), cal per [(cm) (degrees C) (sec)] | $4.03 \times 10^{-4}$ |
| Volume Expansion 25 to 100C(77 to 212F), cc/cc per degree C | $78 \times 10^{-4}$ |

Dow Corning 3145 RTV adhesive-sealant reaches a full cure in about a week. The faster the material cures, the better, in that rapid manufacture is facilitated. A 1 day cure is sufficient to allow the parts to be assembled even though the ultimate physical properties are not fully developed until about a week has passed.

Figure 6:
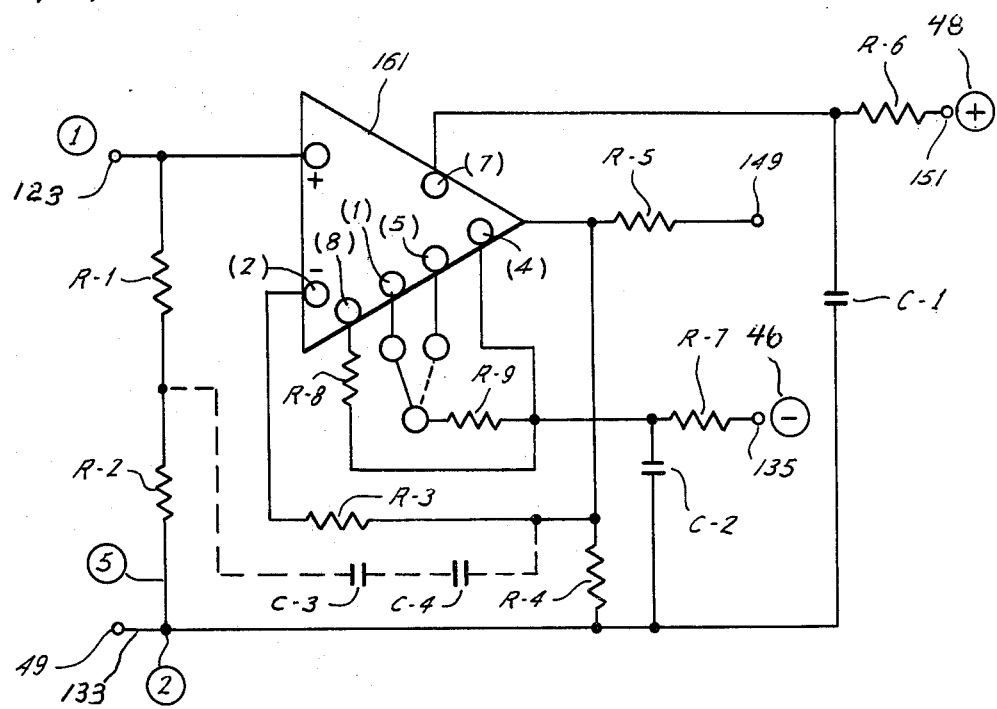
FIG. 6 is a schematic diagram of the electrical components shown in FIG. 5.

The upper face of the lower crystal 95 is connected by electric conductor 121 to post 123 on board 81, which is the junction of R-1 and the non-inverting input of amplifier 161 (FIG. 6). Conductor 121 may be protected by one or more Teflon sleeves, e.g. as shown at 127, where it passes through the silicone rubber ring 111 and spring 93. The lower face of crystal 95 is in contact with electrically conductive cement layer 99 which in turn is connected by electric conduit 129 passing through one or more Teflon sleeves 131 to post 133. The latter is connected by electric conductor 135 to terminal 49 which is electrically insulated from header 63, e.g. by an insulating bushing (not shown) inside tube 125. Terminals 47, 48, and 49 are also electrically insulated from header 63 in the same manner.

The lower face of crystal 97 is connected by electric conductor 41 to post 123. The upper face of crystal 97 is in contact with electrically conductive cement layer 101 which in turn is connected by electric conductor 143 to post 133. The crystals are mounted with their unlike polarities facing each other and connected in parallel so the distortion is reduced due to the generated signal always being the sum of the currents of the two crystals, one being forced to thicken while the other is simultaneously being forced to stretch and become thinner.

Terminals 47, 48 of the accelerometer unit are connected by electric conductors 145, 147 to posts 149, 151 on board 81.

Referring now to FIG. 5, on the underside of board 81 is a printed circuit 153 electrically connecting the posts 123, 133, 135, 149, 151 (which extend through the board) to various electrical components and integrated circuit elements whose electrical schematic diagram appears on FIG. 6.

Referring to FIG. 6, there is shown an integrated circuit amplifier component 161, a plurality of resistors R1-R9 and capacitors C1-C2, and interconnecting electrical conductors. The details of the circuit are not part of the present invention, for any suitable amplifier may be used. In the example shown, the values of the electrical components are as follows:

| Amplifier 161 | | VC4250 or LM4250 |
|---|---|---|
| R-1 | | 180K |
| R-2 | | 91K |
| R-3 | | 220K |
| R-4 | | 10K |
| R-5 | | 100 ohms |
| R-6 | | 22 ohms |
| R-7 | | 22 ohms |
| R-8 | | 2.2 megohms |
| R-9 | | Offset |
| C-1 | | 6.8 microfarads |
| C-2 | | 6.8 microfarads |
| C-3 | (optional) | 6.8 microfarads |
| C-4 | (optional) | 6.8 microfarads |

C-3 and C-4 are used when it is desired to obtain better low frequency response, accelerometers, as distinct from velocity responsive geophones, normally being used when a response to the lower frequency range of 0.1 to 30 cycles per second is desired as well as a response to the higher 30 to 1000 cps. range.

The operation of the above described apparatus is generally similar to that of other seismometer survey apparatus in that the use of an array of several parallel connected seismometers, as shown in FIG. 1 and 2, tends to cancel out the direct responses and low level reflections of the seismic energy created by detonation of an explosive in the vicinity of the array while reflections from lower levels are added, being substantially in phase. The combined output of the array of seismometers is amplified and recorded, e.g. on magnetic tape. The use of accelerometers for the seismometers, rather than velocity responsive devices, enhances the high frequency response. The particular accelerometers according to the invention are an improvement because they can be manufactured at low cost with a high degree of uniformity of one unit compared to others, because of their low distortion, and because of their high energy output, e.g. ½ to 1 volt per g of acceleration. The construction is very rugged which not only allows for rough handling in the field but, due to the stiffness, causes mechanical resonance of the unit to be much higher than the frequencies to be picked up by the unit and thereby to avoid distortion. The spherical ball type mass is inexpensive, easily duplicated, and produces less distortion than other shapes mounting rings are inexpensive and easily duplicated from one unit to the next; they also provide desirable coupling of the crystals both to the ball and to the case and springs; they also provide high frequency damping, and contribute to the ruggedness of the unit.

Modifications of the invention can be made by one skilled in the art without departing from the spirit of the invention.

We claim:

1. An accelerometer comprising support means, planar piezoelectric first crystal means carried by said support means, a mass having a surface at least a portion of which is spherically curved and which curved surface portion is in contact with said crystal means, and elastomeric material disposed in the annular space between said surface portion and said crystal means around the place of contact between said surface portion and said crystal means and in engagement with said surface portion and said crystal means, said crystal means comprising layers of crystal and spring material with a layer of adhesive therebetween, said elastomeric material providing more damping than would exist absent such material said elastomeric material further serving to couple the acceleration forces developed between said support means and said mass in a non-linear fashion tending to neutralize the effect of the non-linear voltage - bending function of the crystal layer of the crystal means and of the non-linear bending of the crystal means due to its multiple layers and materials to yield lower distortion voltage output than would be had if said elastomeric material were omitted.

2. Combination of claim 1 in which the elastomer is silicone rubber.

3. Combination of claim 2 in which the rubber is room temperature vulcanizing.

4. Combination of claim 1 in which the elastomer is an adhesive self adhered to said spherical surface of the mass and to said first crystal means.

5. Combination of claim 1 in which said support means includes a case supporting said first crystal means and encompassing said mass, said elastomer being in engagement with said case.

6. Combination of claim 5 in which said case is cylindrical and said first crystal means is of circular disc shape.

7. Combination of claim 6 in which said first crystal means includes a circular disc shaped spring to which is cemented in concentric relationship a disc shaped piezoelectric crystal of smaller diameter.

8. Combination of claim 7 wherein said mass is a sphere and including a second crystal means constructed like the first said crystal means, the second crystal means being associated with said mass and case with elastomer the same as said first crystal means except positioned diametrically opposite to said first crystal means with reference to said sphere.

9. Combination of claim 8 wherein each said crystal means has a positive and a negative crystal polarity side and are disposed with unlike crystal polarities facing, the cement between the crystal and spring of each crystal means being conductive, the center area of each spring being etched.

10. In combination of claim 8 wherein said case includes two telescoping portions and the assembly comprising said crystal means, with said mass sandwiched there between, is captured between inwardly facing shoulders, one in each of said telescoping portions of said cylindrical case, said crystal means closing the ends of said case, the space inside said case around said assembly being filled with air, said case being provided with vent means in the side thereof to allow the case to breathe, said telescoping portions being held together by one abutting a shoulder on the other and the end of said other being rolled over the end of said one.

* * * * *